US006913131B2

(12) United States Patent
Fletcher

(10) Patent No.: US 6,913,131 B2
(45) Date of Patent: Jul. 5, 2005

(54) CASH HANDLING MACHINE

(75) Inventor: Paul Robert Fletcher, Camberley (GB)

(73) Assignee: Mars, Incorporated, McLean, VA (US)

( * ) Notice: Subject to any disclaimer, the term of this patent is extended or adjusted under 35 U.S.C. 154(b) by 103 days.

(21) Appl. No.: 10/033,409

(22) Filed: Dec. 28, 2001

(65) Prior Publication Data

US 2002/0084168 A1 Jul. 4, 2002

(51) Int. Cl.[7] .................................................. G06F 7/08
(52) U.S. Cl. ........................ 194/217; 194/202; 194/350
(58) Field of Search ............................ 453/17; 194/350, 194/202, 217; 235/379; 705/43; 340/5.92

(56) References Cited

U.S. PATENT DOCUMENTS 1,765,014 A * 6/1930 Hochriem ................... 194/212
4,512,453 A * 4/1985 Schuller et al. ............. 194/200
4,883,158 A 11/1989 Kobayashi et al. ......... 194/217
5,091,713 A * 2/1992 Horne et al. ............... 340/5.92
5,499,944 A 3/1996 Weston et al. ................ 453/17

FOREIGN PATENT DOCUMENTS

GB 2187021 8/1987
JP 02 257383 10/1990

* cited by examiner

*Primary Examiner*—Richard E. Chilcot, Jr.
(74) *Attorney, Agent, or Firm*—Fish & Richardson P.C.

(57) ABSTRACT

A cash handling machine, such as a vending machine, includes various components, such as cash store, that are located within the housing. The machine is operable in a normal mode, in which a credit value is accumulated in response to cash received, and a float mode in which cash received is directed to the cash store without giving credit to the user. The machine can be switched between the normal mode and the float mode in response to an operation by a person, wherein the operation can be performed by the person without the person having access to internal components of the machine.

11 Claims, 1 Drawing Sheet

CASH HANDLING MACHINE

This invention relates to cash handling machines, such as gaming or amusement machines, payphones or vending (e.g. ticketing) machines. The invention will be described primarily in the context of coin handling machines, but is also applicable to machines which can handle banknotes, or a combination of coins and banknotes.

A major cost associated with the operation of such machines relates to the need for the machines to be visited frequently by trusted servicemen for retrieval of cash received by the machines and replenishment of cash stores which store cash for dispensing as change to users of the machines. Vending machines also need to have their stock replenished. The cost involved in training servicemen and paying for their time in visiting the machines can be very substantial. Sometimes, a machine needs to be visited to perform one of the service operations even though the other operations are not needed; for example, if the machine runs out of change, the serviceman would have to visit even though this is not required for collection of cash or replenishment of stock.

It has been known in such circumstances for servicemen to leave on-site keys for accessing the interior of the cash handling machine together with a stock of coins so that an on-site manager can replenish the change tubes. This obviously leads to a lack of security, but is an indication of the desirability of reducing the workload of servicemen.

A typical servicing operation will involve unlocking a cash handling machine, retrieving the cashbox which would store multiple denominations of cash, and then refilling a number of change stores, each associated with a respective denomination, to predetermined "float" levels, normally using cash from the cashbox, and possibly after operating a keypad on a validator located within the machine housing to put the validator in a special "float" mode which prevents credit being given in response to received cash. The cashbox is then emptied, replaced, and the housing locked.

Aspects of the present invention are set out in the accompanying claims.

According to one aspect, a cash handling machine can be caused by an operation external to the machine to be switched into a float mode in which cash can be inserted in the normal way into the machine but is then directed to one or more change stores without incrementing a credit count. Thus, it is possible to replenish the change stores without requiring internal access to the cash machine. Thus, a serviceman can leave cash with an on-site manager who can then replenish the change stores when this becomes necessary without compromising the security of the machine and without interfering with its normal operation. Cash handling machines often store audit data including details of the transactions carried out by the machine (see for example EP-A-18718 and EP-A-109758, which are incorporated herein by reference), and by having a separate float mode in which the credit count is not incremented, the audit data can be arranged to distinguish between normal transactions and those carried out during the float mode, the present invention enabling this to be achieved without requiring the presence of a serviceman.

The float mode could be initiated by an operator, for example the on-site manager. This could be achieved by operating a keypad of the machine, possibly the same one as is used for selecting a product to be vended. In a preferred embodiment, however, a special token is inserted into the machine using the normal slot used for inserting cash, and a validator for authenticating and denominating currency is arranged to detect the token and in response thereto to switch the machine into its float mode.

According to a still further aspect of the invention, which may be used independently of or together with any of the other aspects, a cash handling machine has a first cash store, which is replenished by cash received by the machine and which can dispense cash as change to a user, and a second cash store which can be emptied by a serviceman. The machine is responsive to a float instruction (preferably externally-generated) for discharging cash from the first store to the second store. Preferably, the first store has respective regions for respective denominations, and each region is discharged until the level of cash stored thereby reaches a predetermined float level.

This additional aspect of the invention enables the machine to carry out a part of the serviceman's tasks automatically, thus saving him time. In particular, any change stores with an excess of cash above the desired float levels are operated so as to shift the excess cash into the second store, i.e. the cashbox, which will then subsequently be emptied by the serviceman.

In a preferred embodiment, the float instruction can be transmitted from a remote location, so that this stage of the float operation can be performed before the serviceman reaches the cash machine, e.g. by using a telephone. In an alternative embodiment, the float instruction can be triggered by the unlocking and/or opening of an access door permitting the serviceman to access the cashbox.

Figure 1:
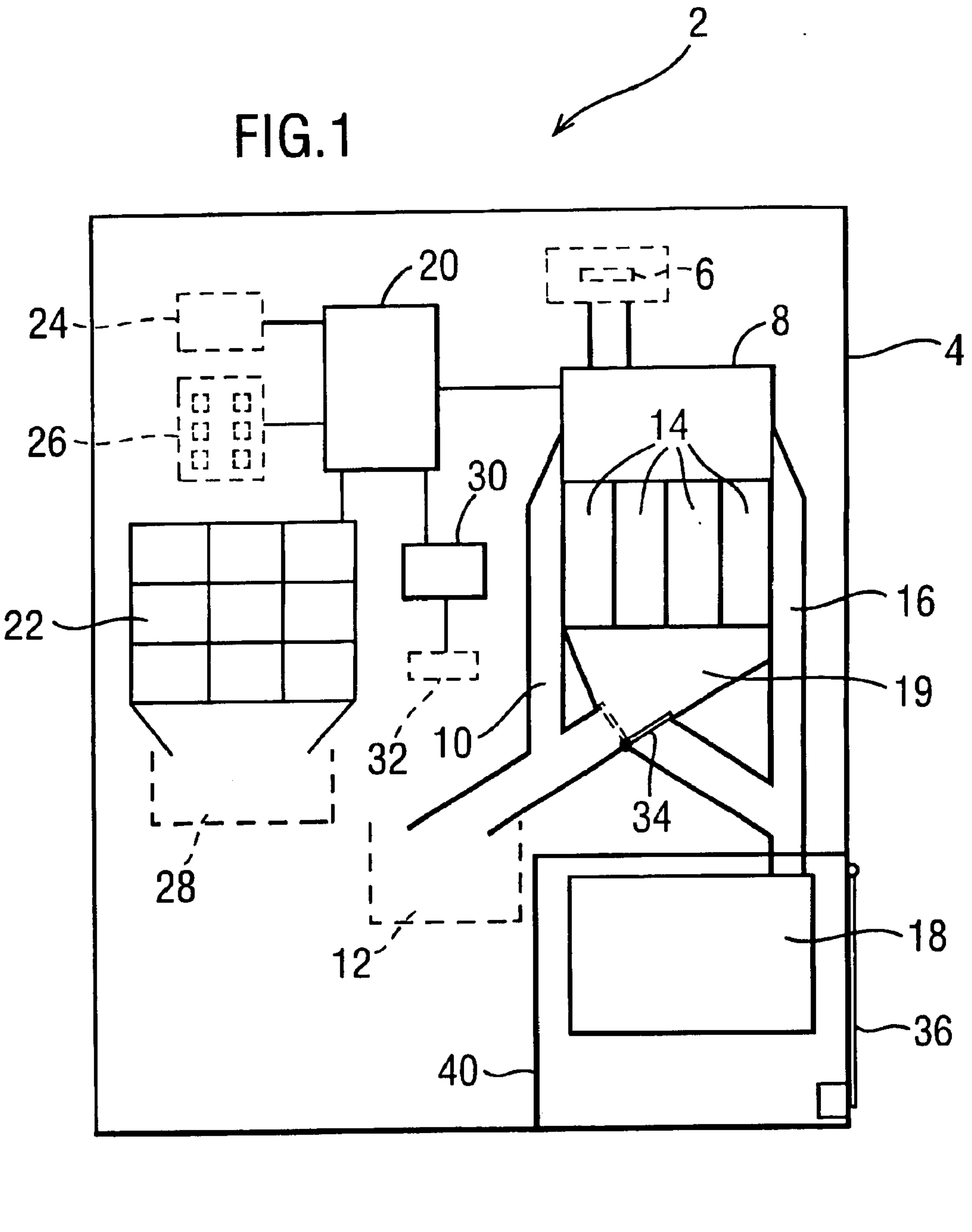
FIG. 1 is a schematic diagram of an example of a cash handling machine according to the invention.

An arrangement embodying the invention will now be described by way of example with reference to the accompanying drawing, FIG. 1, which is a schematic diagram of a cash handling machine in accordance with the invention.

In the illustrated embodiment, the cash handling machine 2 is a vending machine. The parts shown in solid lines are located within a housing 4 of the vending machine. The parts shown in broken lines are accessible at the exterior of the housing 4.

A cash receiving means 6 in the form of a coin slot, allows a user to insert cash, which is then delivered to a validator 8, which tests each coin to determine its authenticity and denomination. Rejected coins are delivered via a path 10 to an output slot 12. Accepted coins are sent either to a respective one of a number of change stores 14 each for storing a respective denomination, or via a path 16 to a cashbox 18. Coins in the change stores 14 can be dispensed in selected combinations as change; these dispensed coins travel via a path 19 to the outlet 12.

The coin validator 8 is connected to a vending machine control board 20. The control board 20 is also connected to a product dispensing means 22, a display 24 and a product selection means in the form of a keypad 26.

In a normal mode of operation, a user can operate the keypad 26 to select a desired product, and the control board 20 will cause the dispensing means 22 to dispense the selected product on condition that an internal credit count stored either by the control board 20 or the validator 8 and incremented in response to received, authentic cash, exceeds a stored price. The dispensed product is sent to a product outlet 28.

The arrangement described so far is conventional.

A conventional way of operating such a machine would be for a serviceman to visit the machine regularly, to open an access door permitting access to the entire interior, to remove the cashbox 18, to adjust the levels of the coins stored by the change tubes 14 until they match predetermined float levels, to replenish the stock in the product dispenser 22 and then, after having emptied the cashbox 18, to replace it and then close and lock the housing 4.

The machine 2 of the present embodiment is serviced differently.

It is known to monitor the levels of change in change tubes, and, if certain conditions indicate that there may not be enough coins to provide adequate change, to cause an "exact change" indication to appear on a display, such as the display 24. (See for example GB-A-2006501 and GB-A-2348732, which are incorporated herein by reference.) In the present embodiment, the display also preferably indicates the denomination or denominations associated with the change store or change stores 14 which require replenishing. Instead of calling out the serviceman, an on-site person switches the machine 2 into a "float-up" mode without requiring access to the interior of the machine. This could be done by operating the keys of the keypad 26 in a special sequence. Preferably, however, instead the person has a special token which he inserts through the slot 6. This is recognised by the coin validator 8, which then causes the machine to switch into its float-up mode. (Preferably the arrangement is such that, because the token is not recognised as a valid coin, it is rejected and thus refunded to the output slot 12.)

The person then inserts coins of the appropriate denomination(s) through the slot 6. Each of these is tested by the validator 8 and found to be a valid coin of an appropriate denomination for sending to a coin store 14 which requires replenishment. Accordingly, this operation of directing the coins to the coin store 14 is performed exactly as in the normal mode. However, because the machine is in the float-up mode, the credit count stored by the validator 8 or the control board 20 is not incremented. Also, any stored audit data which represents the amount of money inserted during the normal mode is not altered.

This continues until the coin store 14 is sufficiently replenished, i.e. preferably until the levels of coins are at least equal to the predetermined float levels. At this point, the indication on the display 24 changes to indicate that these levels have been reached. The machine 22 can then be automatically switched to the normal mode in response to these levels being reached. Alternatively, the machine can be switched to the normal mode in response to operation of the keypad 26, or insertion of the same or a different special token, or automatically at a predetermined time after the last insertion of an item through the coin slot 6.

Accordingly, replenishment of the coin tubes does not require a visit from the normal serviceman.

The display indicating a denomination which requires replenishment can be produced whenever the level of that denomination falls below a predetermined threshold (e.g. the float level), rather than waiting for the conditions giving rise to the "exact change" display.

When the cashbox 18 needs emptying, the machine is put into a "float-down" mode in response to an instruction received by the machine 2. In the preferred embodiment, this instruction is issued remotely, via a telephone call. For this purpose, the machine 2 has a modem 30 connected to the control board 20 and to a conventional socket 32 allowing coupling to a standard telephone line.

In response to the instruction, a gate 34 is operated so that it moves to the position shown in broken lines and coins discharged from the change tubes 14 are directed to the cashbox 18, instead of to the outlet 12. Any change tubes 14 which store coins in excess of a predetermined float level are then caused to discharge the coins until the level reaches the float level.

Thus, at the time the service engineer arrives, the float operation will have been completed with the possible exception that some of the change tubes 14 may require replenishing. The serviceman can then unlock and open an access panel 36, and then remove and empty the cashbox 18. A replenishing operation, possibly using coins from the cashbox 18, can then be carried out in a similar manner to that described above. Then, the cashbox 18 is replaced and the access panel 36 is re-locked. (Preferably, the on-site manager performs a "float-up" operation, as described above, before the serviceman arrives, so the serviceman does not need to perform the replenishing operation.)

The float down instruction could instead be produced in response to opening of the access panel 36, which may be detected by a switch coupled to the control board 20.

It is preferred that the cashbox 18 be mounted in a partitioned area, the partition 40 separating the part of the machine housing the cashbox 18 from other parts containing, for example, the product dispenser 22 and/or the change tubes 14. One or more other, lockable access panels may be provided for access to other areas of the cash handling machine 2.

By providing access only to the cashbox 18, the contents of which would be recorded by the audit data stored in the cash handling machine 2, it is possible to allow the cashbox emptying process to be carried out without requiring the presence of the trusted serviceman. Accordingly, if desired, an on-site manager could be arranged to perform the float-up operation, which does not require access at all to the interior of the cash machine 2, and the float-down operation followed by removal of the cashbox 18, which requires only access to the part of the machine housing the cashbox 18 and not to the rest of the machine. Thus, when the serviceman appears, all the cash-handling service operations have been completed, so that the time required to be spent on site is substantially reduced.

What is claimed is:

1. A cash handling machine comprising:

a housing containing internal components of the machine, cash receiving means to receive cash deposited by a user, a first cash store which is located inside the housing and from which cash can be dispensed to the user, a further cash store which is located inside the housing, unlockable access means which can be unlocked to provide to provide access to the further cash store but not to the first cash store, and means located within the housing for accumulating a credit value based on cash received by the cash receiving means, wherein the machine is operable in a normal mode, in which a credit value is accumulated in response to cash received by the cash receiving means, and a float mode in which cash received by the receiving means is directed to the cash store without giving credit to the user, the machine further including means for switching between the normal mode and the float mode in response to an operation by a person, wherein the operation can be performed without the person having to access the internal components of the machine, the machine being operable in response to a received instruction to discharge cash items from the first cash store to the further cash store, wherein the machine includes means for issuing said instruction in response to unlocking of said access means.

2. A machine as claimed in claim 1, wherein the machine has a cash recognition means operable to determine the authenticity of cash received by the receiving means, and further operable to cause the machine to switch to the float mode in response to the testing of an article of a predetermined type received by the cash receiving means.

3. A machine as claimed in claim 2, wherein the cash recognition means is operable to determine the denomination of cash items received by the receiving means during the float mode, and to direct the received items to one of a plurality of storage regions of the first cash store, each region being associated with a respective denomination, in dependence upon the results of the determination.

4. A machine as claimed in claim 1 wherein the means for switching between the normal mode and the float mode comprises a keypad which is also operable by a user to select a product to be vended by the machine.

5. A machine as claimed in claim 4, including cash recognition means for determining the authenticity and denomination of cash items received by the receiving means, and operable to direct cash items received by the receiving means during the float mode to one of a plurality of storage regions of the first cash store, each region being associated with a respective denomination, in dependence upon the results of the determination.

6. A machine as claimed in claim 1, the machine storing float levels for respective cash denominations, each float level representing the amount of cash items of the respective denominations to be stored following a float operation, and being further operable during the float mode to provide a display visible externally of the machine indicating the denominations of cash items for which the current stored level is less than the respective float level.

7. A machine as claimed in claim 1, having means for receiving an instruction issued remotely from the machine for performing said discharging operation.

8. A cash handling machine as claimed in 1, wherein said first store has a plurality of regions each for storing a respective denomination, and wherein said further store has a region within which multiple denominations are stored.

9. A cash handling machine comprising:

a first cash store operable to dispense cash to a user and replenishable by cash received from a user, a further store, and a housing that prevents access to the further store, the housing including an unlockable access means which, upon unlocking, permits access to the further store but not to the first store, and provides removal of the further store from the machine, the machine being responsive to an instruction for discharging cash from the first store to the further store until one or more predetermined conditions are met, the machine including means for issuing said instruction in response to unlocking of said access means.

10. A cash handling machine as claim 9, wherein said first store has a plurality of regions each for storing a respective denomination, and wherein said further store has a region within which multiple denominations are stored.

11. A cash handling machine comprising:

a housing containing internal components of the machine, cash receiving means to receive cash deposited by a user, a cash store which is located inside the housing and from which cash can be dispensed to the user, a further cash store, wherein the machine is operable in response to a received instruction to discharge cash items from the first-mentioned cash store to the further cash store, wherein the housing prevents access to the further store, and has an unlockable access means which, upon unlocking, permits access to and removal of the further store from the machine, but which does not permit access to the first store;

means for issuing said instruction in response to unlocking of said access means; and means located within the housing for accumulating a credit value based on cash received by the cash receiving means, wherein the machine is operable in a normal mode, in which a credit value is accumulated in response to cash received by the cash receiving means, and a float mode in which cash received by the receiving means is directed to the cash store without giving credit to the user, the machine further including means for switching between the normal mode and the float mode in response to an operation by a person, wherein the operation can be performed without the person having to access the internal components of the machine.

* * * * *

UNITED STATES PATENT AND TRADEMARK OFFICE

CERTIFICATE OF CORRECTION

PATENT NO. : 6,913,131 B2
DATED : July 5, 2005
INVENTOR(S) : Paul R. Fletcher

It is certified that error appears in the above-identified patent and that said Letters Patent is hereby corrected as shown below:

Title page,
Insert Item -- [30] Foreign Application Priority Data
December 28, 2001 EP 00311734.8 --.

Signed and Sealed this

Thirteenth Day of September, 2005

JON W. DUDAS
*Director of the United States Patent and Trademark Office*

UNITED STATES PATENT AND TRADEMARK OFFICE

CERTIFICATE OF CORRECTION

PATENT NO. : 6,913,131 B2
DATED : July 5, 2005
INVENTOR(S) : Paul R. Fletcher

It is certified that error appears in the above-identified patent and that said Letters Patent is hereby corrected as shown below:

Title page,
Insert Item -- [30] Foreign Application Priority Data
December 28, 2000 EP 00311734.8 --.

This certificate supersedes Certificate of Correction issued September 13, 2005.

Signed and Sealed this

Sixth Day of December, 2005

JON W. DUDAS
*Director of the United States Patent and Trademark Office*